United States Patent
Keppeler et al.

(10) Patent No.: US 11,168,600 B2
(45) Date of Patent: Nov. 9, 2021

(54) METHOD FOR OPERATING AN EXHAUST SYSTEM OF AN INTERNAL COMBUSTION ENGINE OF A MOTOR VEHICLE AND EXHAUST SYSTEM FOR AN INTERNAL COMBUSTION ENGINE OF A MOTOR VEHICLE

(71) Applicant: Daimler AG, Stuttgart (DE)

(72) Inventors: Berthold Keppeler, Owen (DE); Thorsten Woog, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/963,111

(22) PCT Filed: Dec. 21, 2018

(86) PCT No.: PCT/EP2018/086511
§ 371 (c)(1),
(2) Date: Jul. 17, 2020

(87) PCT Pub. No.: WO2019/141490
PCT Pub. Date: Jul. 25, 2019

(65) Prior Publication Data
US 2021/0047954 A1 Feb. 18, 2021

(30) Foreign Application Priority Data
Jan. 19, 2018 (DE) .................. 10 2018 000 434.2

(51) Int. Cl.
*F01N 3/20* (2006.01)
*F01N 13/00* (2010.01)
(Continued)

(52) U.S. Cl.
CPC .............. *F01N 3/208* (2013.01); *F01N 3/035* (2013.01); *F01N 3/106* (2013.01); *F01N 13/009* (2014.06);
(Continued)

(58) Field of Classification Search
CPC combination set(s) only.
See application file for complete search history.

(56) References Cited

U.S. PATENT DOCUMENTS 9,429,062 B2 * 8/2016 Osburn ................ F01N 3/2066
10,287,939 B2 5/2019 Bleckmann et al.
(Continued)

FOREIGN PATENT DOCUMENTS

DE 10 2015 016 986 A1 6/2017
DE 10 2016 211 575 A1 12/2017
(Continued)

OTHER PUBLICATIONS

PCT/EP2018/086511, International Search Report dated Feb. 1, 2819 (Two (2) pages).
(Continued)

*Primary Examiner* — Binh Q Tran
(74) *Attorney, Agent, or Firm* — Crowell & Moring LLP

(57) ABSTRACT

A method for operating an exhaust system of an internal combustion engine of a motor vehicle, in which exhaust gas from the internal combustion engine flows through a first SCR catalytic converter, which is followed by an ammonia barrier catalytic converter, and flows through a second SCR catalytic converter which is disposed downstream of the ammonia barrier catalyst, includes introducing a reducing agent introduced into the exhaust gas by a first metering device upstream of the first SCR catalytic converter and by a second metering device upstream of the second SCR catalytic converter. When a predetermined threshold value of a temperature of a region of the exhaust system is exceeded, a quantity of reducing agent introduced into the exhaust gas by the first metering device is increased.

9 Claims, 3 Drawing Sheets

(51) Int. Cl.
*F01N 3/035* (2006.01)
*F01N 3/10* (2006.01)

(52) U.S. Cl.
CPC .. *F01N 2560/021* (2013.01); *F01N 2560/026* (2013.01); *F01N 2560/06* (2013.01); *F01N 2560/14* (2013.01); *F01N 2570/14* (2013.01); *F01N 2610/02* (2013.01); *F01N 2900/1602* (2013.01); *F01N 2900/1622* (2013.01)

(56) References Cited

U.S. PATENT DOCUMENTS

| | | | |
|---|---|---|---|
| 10,690,033 B1* | 6/2020 | Johnson | F01N 3/106 |
| 10,828,603 B2* | 11/2020 | Chen | F01N 3/208 |
| 2008/0008629 A1* | 1/2008 | Doring | F01N 13/0097 422/171 |
| 2009/0193794 A1* | 8/2009 | Robel | F02M 26/15 60/295 |
| 2011/0011068 A1* | 1/2011 | Ren | B01J 29/46 60/297 |
| 2015/0052878 A1* | 2/2015 | Qi | F01N 3/208 60/277 |
| 2016/0312678 A1 | 10/2016 | Siddhanthi et al. | |
| 2017/0130628 A1 | 5/2017 | Franz et al. | |

FOREIGN PATENT DOCUMENTS

| | | |
|---|---|---|
| DE | 10 2016 215 207 A1 | 2/2018 |
| EP | 1 882 832 A2 | 1/2008 |
| WO | WO 2016/039720 A1 | 3/2016 |
| WO | WO 2017/108165 A1 | 6/2017 |

OTHER PUBLICATIONS

German-language German Office Action issued in German application No. 10 2018 000 434.2 dated Oct. 30, 2018 (Seven (7) pages).
Konrad Reif et al., "Exhaust technology for internal combustion engines," Wiesbaden: Springer Vieweg, 2015 (Bosch automotive specialist information), ISBN 978-3-658-09521-5 (Eight (8) pages).

* cited by examiner

METHOD FOR OPERATING AN EXHAUST SYSTEM OF AN INTERNAL COMBUSTION ENGINE OF A MOTOR VEHICLE AND EXHAUST SYSTEM FOR AN INTERNAL COMBUSTION ENGINE OF A MOTOR VEHICLE

BACKGROUND AND SUMMARY OF THE INVENTION

The invention relates to a method for operating an exhaust system of an internal combustion engine of a motor vehicle. Here, exhaust gas of the internal combustion engine flows through a first selective catalytic reduction (SCR) catalytic converter, downstream of which an ammonia barrier catalytic converter is arranged. The exhaust gas flows through a second SCR catalytic converter, which is arranged downstream of the ammonia barrier catalytic converter in the exhaust system. By means of a first metering device, a reducing agent can be introduced into the exhaust gas upstream of the first SCR catalytic converter, and by means of a second metering device, the reducing agent can be introduced into the exhaust gas upstream of the second SCR catalytic converter. Furthermore, the invention relates to an exhaust system for an internal combustion engine of a motor vehicle.

DE 10 2015 016 986 A1 describes an exhaust gas aftertreatment device for an internal combustion engine, in which exhaust gas of the internal combustion engine flows through a combination catalytic converter which comprises an SCR part and a second catalytic converter part. The second catalytic converter part is designed as an ammonia barrier catalytic converter or ammonia slip catalytic converter (ASC). A first metering device is arranged upstream of the combination catalytic converter, which serves to introduce a urea solution into the exhaust gas. A second metering device is arranged downstream of the combination catalytic converter. Furthermore, a second SCR catalytic converter is arranged in the exhaust gas aftertreatment device downstream of the second metering device, upstream of which a particulate filter is arranged.

Such an arrangement having a first SCR catalytic converter close to the engine and a second SCR catalytic converter is advantageous in order to achieve maximum conversion of nitrogen oxides in the entire characteristic curve of an internal combustion engine designed as a diesel engine. This will be explained with reference to FIG. 1 and FIG. 2.

FIG. 1 schematically shows an exhaust system 10 according to the prior art, as can be provided with regard to a maximum conversion of nitrogen oxides in the exhaust gas of a diesel engine of a motor vehicle. The exhaust system 10 comprises an SCR system 12 close to the engine, which comprises a first metering device 14, a diesel particulate filter 16 having an SCR coating (SDPF) and a first SCR catalytic converter 18. A flow direction of the exhaust gas through the exhaust system 10 is illustrated in FIG. 1 by an arrow 20. Accordingly, a diesel oxidation catalytic converter 22 is arranged upstream of the first metering device 14. The SCR system 12 is arranged close to the engine. Furthermore, a second SCR catalytic converter 24 is present in the exhaust system 10, the SCR catalytic converter being arranged in the region of an underbody of the motor vehicle. Accordingly, this second SCR catalytic converter 24 is also referred to as underbody SCR catalytic converter 24. A second metering device 26 is located upstream of this second SCR catalytic converter 24. By means of the metering devices 14, 26, a reducing agent can be introduced into the exhaust gas which flows through the exhaust system 10. The reducing agent used here is an aqueous urea solution, which is available under the name AdBlue®.

Particularly when high temperatures of more than 500 degrees Celsius are present downstream of the diesel oxidation catalytic converter 22, which are usually accompanied by high exhaust gas mass flows, the second SCR catalytic converter 24 arranged on the underbody of the motor vehicle has a conversion advantage with regard to nitrogen oxides. This is because, due to the position of the second SCR catalytic converter 24 remote from the engine, the temperature of the exhaust gases entering the second SCR catalytic converter 24 is 50 degrees Celsius to 100 degrees Celsius lower than the temperature of the exhaust gases entering the SCR system 12 close to the engine. This can also be illustrated using FIG. 2.

In FIG. 2, the conversion of nitrogen oxides in percent is plotted on an ordinate 28, i.e., the proportion of nitrogen oxides contained in the exhaust gas which are converted with ammonia to nitrogen and water in the respective SCR catalytic converter 18, 24 in a selective catalytic reduction (SCR=selective catalytic reduction). In FIG. 2, the temperature of the exhaust gas downstream of the diesel oxidation catalyst 22 is plotted on an abscissa 30. A first curve 32 illustrates the nitrogen oxide conversion which takes place in the SCR system 12 close to the engine. Accordingly, at temperatures of more than 500 degrees Celsius, the conversion of nitrogen oxides which can be achieved with the SCR system 12 close to the engine drops from around 90 percent to lower values comparatively quickly. A curve 34, which is analogous in shape, illustrates the conversion behavior of the second SCR catalytic converter 24. However, this second curve 34 is shifted further to the right by about 50 degrees Celsius to 100 degrees Celsius, which is illustrated in FIG. 2 by a double arrow 36. Accordingly, the nitrogen oxide conversion at the second SCR catalytic converter 24, which is arranged in the region of the underbody, only drops to below 90 percent at temperatures of more than 600 degrees Celsius. By providing the second SCR catalytic converter 24, a range of high nitrogen oxide conversion. i.e., conversions of more than 90 percent, can be extended to significantly higher loads which occur during diesel engine operation.

However, the NOx conversion capacity of an SDPF/SCR catalytic converter depends very much on the quantity of ammonia stored in the catalytic converter, in particular at comparatively low temperatures of the exhaust gas, i.e., at temperatures below 200 degrees Celsius. Therefore, the highest possible $NH_3$ loading is desirable. At the same time, however, the risk of an $NH_3$ slippage from the exhaust system increases greatly at high ammonia levels. This is because the maximum ammonia storage capacity depends on the temperature of the SDPF/SCR catalytic converter. In this way, the maximum ammonia storage capacity decreases very sharply at temperatures between 330 degrees Celsius and 380 degrees Celsius, and ammonia storage is no longer possible at temperatures above 400 degrees Celsius.

In order to achieve an optimum total conversion of nitrogen oxides with a system that has the first SCR catalytic converter 18 close to the engine and the second SCR catalytic converter 24 arranged on the underbody without an ammonia slip occurring, a very good load regulation for the SCR catalytic converters 18, 24 is absolutely necessary, especially under dynamic boundary conditions. In the SCR system 12 close to the engine, this regulation is usually achieved by adding ammonia or the aqueous urea solution from which ammonia is formed in the hot exhaust gas in order to build up or increase the ammonia level of the first SCR catalytic converter 18. By stopping the metering of the aqueous urea solution, the ammonia stored in the first SCR catalytic converter is used and a reduction of the ammonia level is achieved.

For such a load regulation, however, very precise knowledge of the nitrogen oxide emissions before and after the SCR system 12 and the quantity of aqueous urea solution added is required. The nitrogen oxide emissions can be measured with a nitrogen oxide sensor or mapped by models. However, in the event of a rapid temperature rise to temperatures in excess of 350 degrees Celsius, nitrogen oxide breakthroughs can occur due to inaccurate regulation of the ammonia level. This is the case if there is too little ammonia in the SCR system 12 close to the engine. On the other hand, if too much aqueous urea solution and thus ammonia is introduced into the exhaust system 10 due to the inaccurate regulation, it can result in a strong ammonia slip.

If the underbody SCR catalytic converter 24 is used in addition to the SCR system 12 close to the engine, the regulation of the ammonia level for this second SCR catalytic converter 24 is made considerably more difficult. This is due to the fact that, on the one hand, urea and thus ammonia can be introduced into the exhaust system via the second metering device 26 and, on the other hand, ammonia from the SCR system 12 close to the engine can also be present as a source of ammonia. The reason for this is the inaccuracy in determining the quantity of ammonia which is present downstream of the SCR system 12 in the exhaust system 10. Since sensors for detecting nitrogen oxide emissions show a cross-sensitivity to ammonia, an additional strong distortion of the nitrogen oxide signal upstream of the underbody SCR catalytic converter 24 can occur if there is an ammonia slip of the SCR system 12 close to the engine. This leads to inaccurate balancing.

In addition, the reduction of the ammonia level of the second SCR catalytic converter 24, i.e., a consumption of stored ammonia, is considerably more difficult due to the nitrogen oxides released by the diesel engine. This is because the SCR system 12 close to the engine must first be completely free of ammonia so that sufficient nitrogen oxide emissions in the second SCR catalytic converter 24 can reduce the stored quantity of ammonia. Particularly in dynamic operation of the diesel engine or during strong accelerations, there is therefore a risk of it resulting in nitrogen oxide breakthroughs. This is particularly the case under very unsteady operating conditions of the diesel engine and in the transition region in which the centre of gravity of the nitrogen oxide conversion is shifted from the SCR system 12 close to the engine (see curve 32 in FIG. 2) to the underbody SCR catalytic converter 24 (see curve 34 in FIG. 2).

The object of the present invention is therefore to improve a method of the type mentioned above in such a way that the ammonia loading of the second SCR catalytic converter can be adjusted more easily and to create a correspondingly improved exhaust system.

In the method according to the invention for operating an exhaust system of an internal combustion engine of a motor vehicle, exhaust gas from the internal combustion engine flows through a first SCR catalytic converter, which is followed by an ammonia barrier catalytic converter. The exhaust gas then flows through a second SCR catalytic converter, which is arranged downstream of the ammonia barrier catalytic converter in the exhaust system. A reducing agent can be introduced into the exhaust gas upstream of the first SCR catalytic converter by means of a first metering device. By means of a second metering device, the reducing agent can be introduced into the exhaust gas upstream of the second SCR catalytic converter. When a predetermined threshold value of a temperature of a region of the exhaust system comprising the first SCR catalytic converter and/or the ammonia barrier catalyst is exceeded, a quantity of reducing agent introduced into the exhaust gas by means of the first metering device is increased. This is based on the knowledge that the ammonia barrier catalytic converter converts ammonia to nitrogen oxides at higher temperatures and not to nitrogen as at lower exhaust gas temperatures. The ammonia barrier catalytic converter is therefore used upstream of the second SCR catalytic converter in a targeted manner to produce nitrogen oxides by introducing more ammonia into the exhaust gas when the predetermined temperature threshold value is exceeded and oxidizing this ammonia. The increased nitrogen oxide load to which the second SCR catalytic converter is then exposed allows the filling level of the second SCR catalytic converter to be lowered in a targeted manner. The ammonia loading of the second SCR catalytic converter can therefore be adjusted more easily than without the ammonia barrier catalytic converter and without the temperature-dependent increase in the quantity of reducing agent introduced into the exhaust gas.

Furthermore, the ammonia barrier catalyst prevents ammonia slip in the part of the exhaust system arranged downstream of the ammonia barrier catalyst and upstream of the second metering device. The use of the ammonia barrier catalyst close to the engine thus results in the great advantage for the adjustment, in particular for the regulation, of the ammonia level of the second SCR catalytic converter that only the addition of reducing agent by means of the second metering device needs to be considered as an input variable in a model which can be used to determine the ammonia level of the second SCR catalytic converter. Ammonia present in the second SCR catalytic converter which is to be oxidized in the selective catalytic reduction reaction thus originates exclusively from the reducing agent which is introduced into the exhaust system by means of the second metering device. This means that a balance is no longer disturbed by an ammonia slip which is difficult to detect and which can then originate from the first SCR catalytic converter close to the engine if the ammonia barrier catalytic converter is not provided. This also makes it easier to determine or adjust the ammonia loading of the second SCR catalytic converter.

An influence of an ammonia slip on the signal of a nitrogen oxide sensor, which can be arranged upstream of the second SCR catalytic converter for detecting the nitrogen oxide content in the exhaust gas, is thus also eliminated. This also eliminates the problem that ammonia slip can lead to a very inaccurate or greatly increased value due to the cross-sensitivity of the sensor with respect to the ammonia.

Increasing the quantity of reducing agent, which is introduced into the exhaust gas by means of the first metering device when the predetermined threshold value of the temperature is exceeded, thus does not lead to a filling level build-up as usual, but to a targeted filling level reduction of the second SCR catalytic converter with regard to the ammonia. In the exhaust system, it is thus possible, due to the oxidation of ammonia to nitrogen oxides depending on the temperature of the ammonia barrier catalyst, to increase the nitrogen oxide emissions upstream of the second SCR catalytic converter in a targeted manner by overdosing of reducing agent at that metering point of the exhaust system where the first metering device is arranged. This allows the ammonia level of the second SCR catalytic converter to be actively regulated. This can also be done independently of the raw emissions of the internal combustion engine. The otherwise passive variable of nitrogen oxide emissions or nitrogen oxide content upstream of the second SCR catalytic converter thus becomes an actively controllable variable. This also eliminates the risk of a nitrogen oxide breakthrough due to deliberately increased raw nitrogen oxide emissions from the internal combustion engine in order to reduce the filling level of the second SCR catalytic converter. This is because the ammonia level of the second SCR catalytic converter can be lowered independently of the ammonia level of the first SCR catalytic converter.

Preferably, the predetermined threshold value is selected from a temperature range of about 250 degrees Celsius to about 350 degrees Celsius. This is because in this temperature range, the ammonia barrier catalyst converts more ammonia into nitrogen oxides.

It has been shown to be further advantageous to take into account an ageing state of the ammonia barrier catalyst when selecting the threshold value. In particular, it can be provided that, in the event of more pronounced ageing of the ammonia barrier catalyst, the predetermined threshold value or the threshold temperature from which the active level reduction is enabled is shifted to higher temperature values from the range of 250 degrees Celsius to 350 degrees Celsius. This is based on the realization that the selectivity of the oxidation reaction can change due to the ageing of the ammonia barrier catalyst.

It is also advantageous if the threshold value is selected from the temperature value range depending on the technology of the ammonia barrier catalyst. In this way, the different technologies of ammonia barrier catalysts can be taken into account particularly well with regard to their oxidation behavior of ammonia.

Preferably, the quantity of reducing agent introduced into the exhaust gas by means of the first metering device is increased if, in addition to the exceeding of the predetermined threshold value of the temperature, it is determined that ammonia stored in the second SCR catalytic converter is escaping from the second SCR catalytic converter. This is because, in the event of such an incipient ammonia slip, it is particularly useful to counteract further ammonia slip by reducing the ammonia level in the second SCR catalytic converter in a targeted manner.

Preferably, the quantity of reducing agent will be increased to at least one and a half times the quantity that was introduced into the exhaust gas by the first metering device before the temperature exceeds the predetermined threshold value. In particular, the quantity can be increased up to a maximum value which, depending on the temperature of the exhaust and the exhaust gas mass flow rate, is introduced into the exhaust gas by means of the first metering device at most when it is necessary to reduce the nitrogen oxide content in the exhaust gas by means of the first SCR catalytic reduction reaction by means of the selective catalytic reduction reaction.

It has been shown to be further advantageous if, depending on the temperature of the exhaust gas upstream of the first metering device, the reducing agent is at least predominantly introduced into the exhaust gas by means of the second metering device. In other words, depending on the temperature of the exhaust gas upstream of the first metering device, the system switches from a metering by means of the first metering device to a metering by means of the second metering device. This takes account of the fact that at high exhaust gas temperatures in the region of the first SCR catalytic converter, the nitrogen oxide conversion of the first SCR catalytic converter decreases, while at the same temperature of the exhaust gas upstream of the first metering device, the second SCR catalytic converter still shows very high nitrogen oxide conversion rates. Accordingly, a high conversion rate of nitrogen oxides can be achieved over a particularly wide operating range of the internal combustion engine.

This is particularly true if the temperature at which the switchover from the first metering device to the second metering device takes place is selected from a range of values from about 420 degrees Celsius to about 450 degrees Celsius. This is because the specific conversion behavior with regard to nitrogen oxides can be taken into account particularly well in this way, which the first SCR catalytic converter has, which is preferably provided on the outlet side with a coating through which the ammonia barrier catalyst is provided.

Preferably, in order to determine a quantity of reducing agent present in the second SCR catalytic converter, only the quantity of reducing agent introduced into the exhaust gas by means of the second metering device is taken into account. This makes it particularly easy to determine the quantity of reducing agent present in the second SCR catalytic converter.

Finally, it has been shown to be advantageous if the ammonia barrier catalyst is provided as an oxidizing coating applied to a carrier material of the first SCR catalytic converter in an end region on the outlet side of the first SCR catalytic converter. This is because a unit, which provides the first SCR catalytic converter close to the engine and the ammonia barrier catalyst, requires particularly little installation space.

The exhaust system in accordance with the invention for an internal combustion engine of a motor vehicle comprises a first SCR catalytic converter through which exhaust gas can flow, an ammonia barrier catalyst downstream of the first SCR catalytic converter, and a second catalytic converter which is arranged downstream of the ammonia barrier catalyst in the exhaust system. A reducing agent can be introduced into the exhaust gas upstream of the first SCR catalytic converter by means of a first metering device of the exhaust system. Furthermore, a reducing agent can be introduced into the exhaust gas upstream of the second SCR catalytic converter by means of a second metering device of the exhaust system. The exhaust system comprises a control device which is designed to increase a quantity of reducing agent introduced into the exhaust gas by means of the first metering device when a predetermined threshold value of a temperature of a region of the exhaust system comprising the first SCR catalytic converter and/or the ammonia barrier catalyst is exceeded. The control device is thus designed to carry out the method according to the invention. Accordingly, the ammonia loading of the second SCR catalytic converter can be adjusted more easily in such an exhaust system.

The advantages and preferred embodiments described for the method according to the invention also apply to the exhaust system according to the invention and vice versa.

Further advantages, features and details of the invention emerge from the following description of preferred exemplary embodiments as well as in the drawings. The features and combinations of features mentioned above in the description as well as the features and combinations of features mentioned below in the figure description and/or shown in the Figures alone can be used not only in the

DETAILED DESCRIPTION OF THE DRAWINGS

Figure 1:
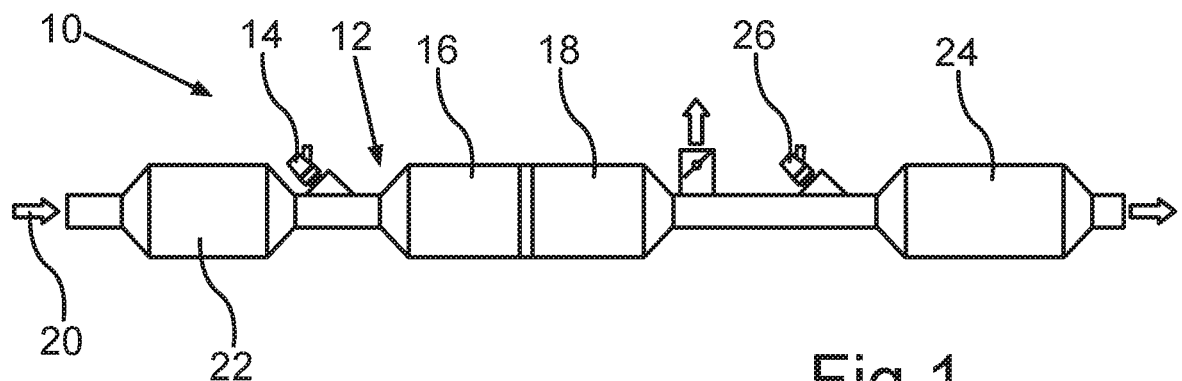
FIG. 1 illustrates an exhaust system of a motor vehicle according to prior art, in which an SCR catalytic converter close to the engine is arranged upstream of an underbody SCR catalytic converter.
Figure 2:
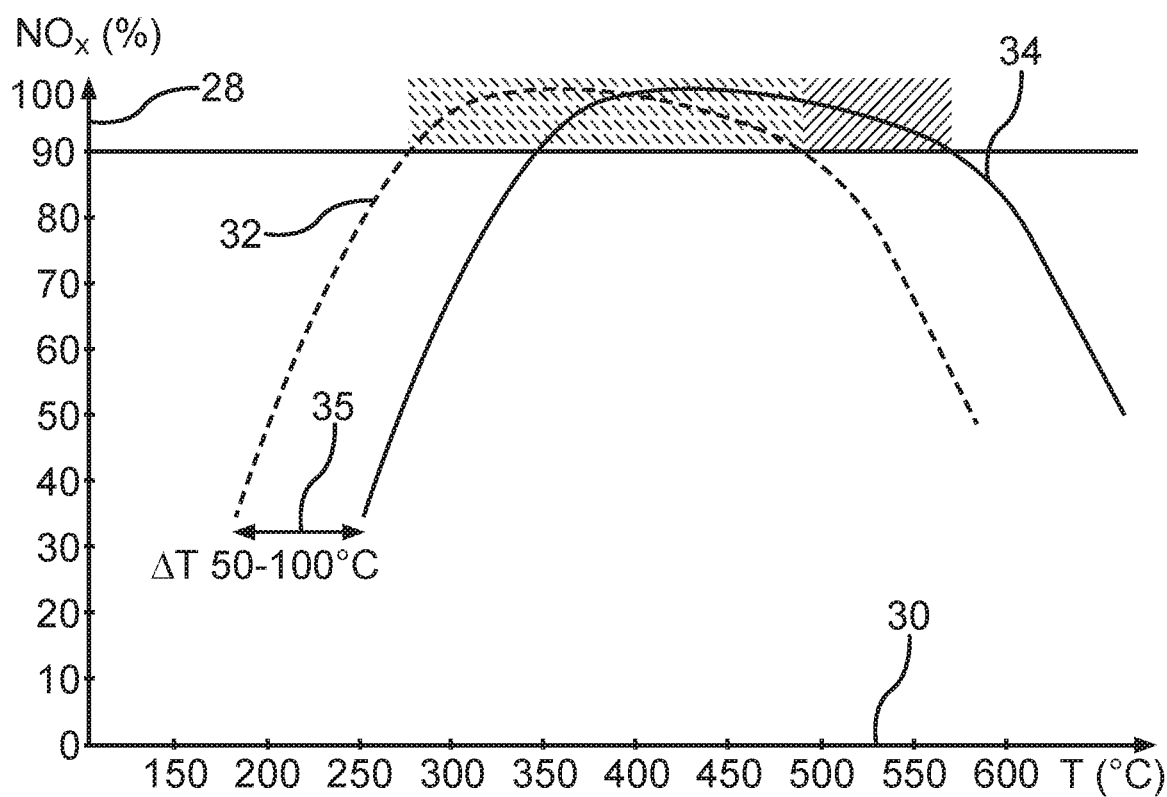
FIG. 2 shows curves, which describe the conversion behavior of the SCR catalytic converter shown in FIG. 1 with regard to nitrogen oxides.

To illustrate the facts concerning FIG. 1 and FIG. 2, the introductory part of the present description is referred to.

Figure 3:
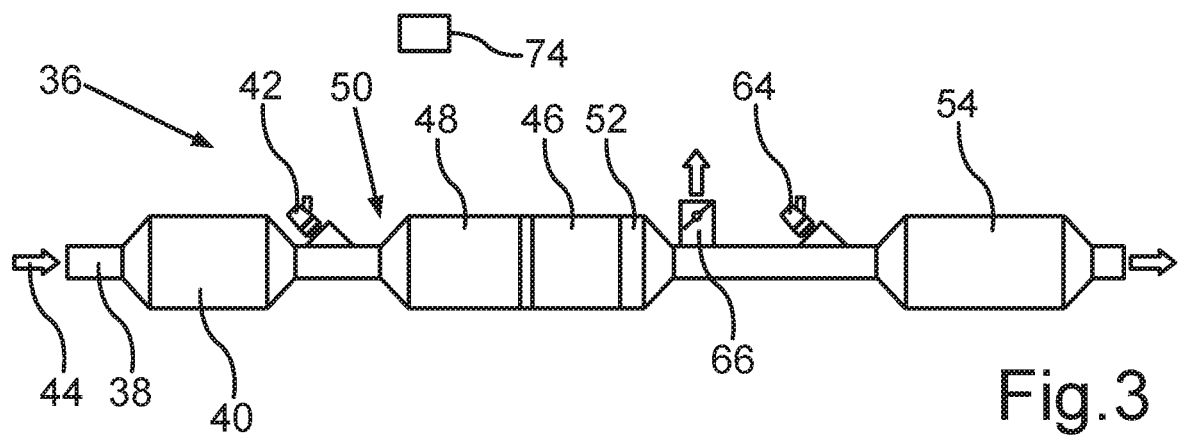
FIG. 3 shows schematically, an exhaust system for an internal combustion engine of a motor vehicle, wherein an SCR system close to the engine has an ammonia barrier catalyst, and a second SCR catalytic converter is arranged downstream of a second metering device downstream of the ammonia barrier catalyst.

FIG. 3 schematically shows an exhaust system 36 for an internal combustion engine (not shown) of a motor vehicle. The internal combustion engine is preferably formed as a diesel engine. Accordingly, in an exhaust pipe 38 of the exhaust system 36 downstream of the internal combustion engine, a first catalytic converter 40 is initially arranged, which can be designed as a diesel oxidation catalytic converter, for example. As this first component for exhaust gas aftertreatment, however, a nitrogen oxide storage catalyst (NSC) or a passive NOx absorber catalyst (PNA) can also be arranged or installed in the exhaust system 36 instead of an oxidation catalyst. Downstream of this first catalytic converter 40, a reducing agent, for example in the form of an aqueous urea solution, can be introduced into the exhaust gas coming from the internal combustion engine by means of a first metering device 42. The direction of flow of the exhaust gas through the exhaust system 36 is illustrated in FIG. 3 by an arrow 44.

When the aqueous urea solution is introduced into the exhaust gas as the reducing agent, ammonia is formed from the urea in the hot exhaust gas. This ammonia is converted to nitrogen and water in a first SCR catalytic converter 46 in a selective catalytic reduction reaction (SCR=selective catalytic reduction) with nitrogen oxides contained in the exhaust gas. The first SCR catalytic converter 46 is preceded by a particulate filter 48, which is designed as a diesel particulate filter and also preferably has an SCR-active coating. Accordingly, the particulate filter 48 is also referred to as SDPF.

An SCR system 50 close to the engine, the SCR system comprising in this case the particulate filter 48 and the first SCR catalytic converter 46, has an additional ammonia barrier catalyst 52 or ammonia slip catalyst in the exhaust system 36 shown in FIG. 3, which is also abbreviated to ASC. The SCR system 50, which is close to the engine and comprises the ammonia barrier catalyst 52, improves the controllability of the ammonia loading of a second SCR catalyst 54 of the exhaust system 36, which is arranged in the region of an underbody of the motor vehicle in the present case.

In order to provide the ammonia barrier catalyst 52, a partial region of the first SCR catalytic converter 46 on the exhaust side or outlet side is provided with an oxidation-active coating which contains precious metal components. By way of example, this oxidation-active coating may contain Pt, Pd, Rh or similar. In the case of the SCR catalytic converter 46, which can in particular be a ceramic substrate with a copper-based zeolite coating, for example, a part of the SCR-active coating is thus replaced by the ASC coating. Due to this oxidative coating, which provides the ammonia barrier catalyst 52, ammonia is converted predominantly to nitrogen or predominantly to nitrogen oxides, depending on the temperature of the exhaust gas in the SCR system 50. This should be illustrated by FIG. 3.

Figure 4:
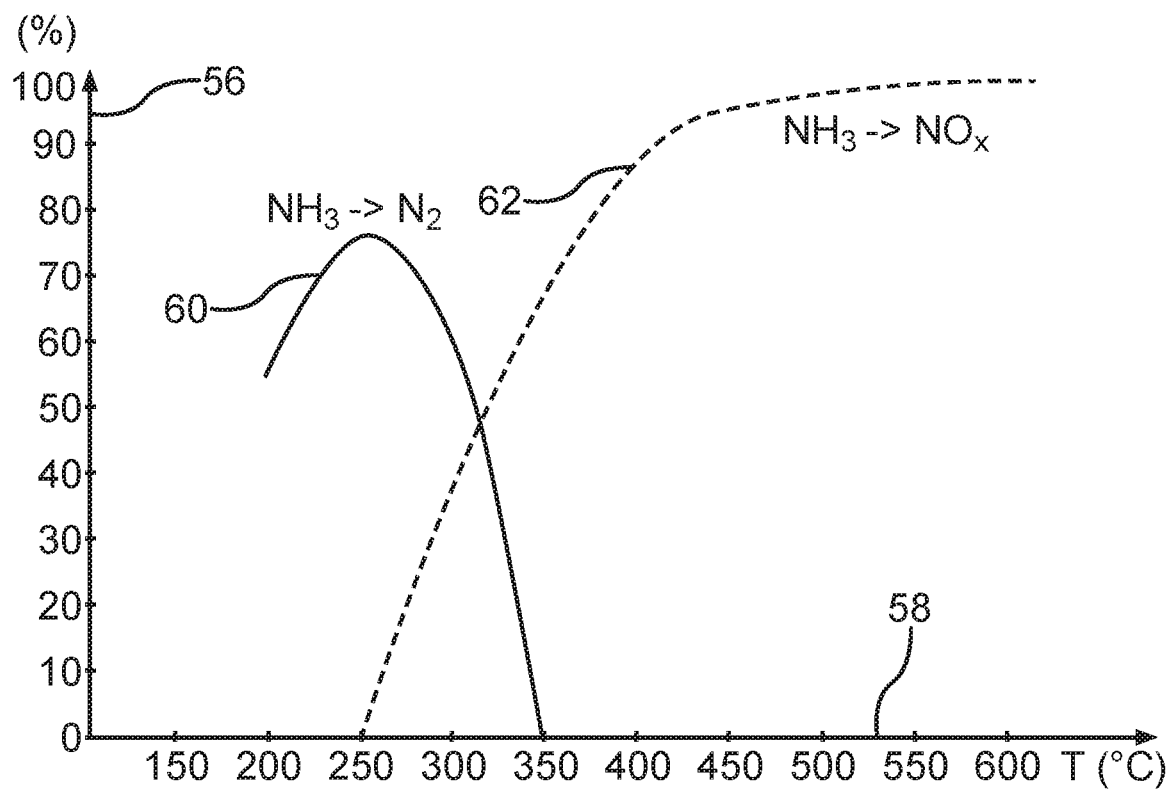
FIG. 4 shows curves, which depict the ammonia conversion behavior of the ammonia barrier catalyst depending on the temperature.

In FIG. 3, the ammonia conversion in percent is plotted on an ordinate 56 and the temperature in degrees Celsius on an abscissa 58. Here, a first curve 60 illustrates the conversion of ammonia to nitrogen, which drops rapidly after reaching a maximum. After exceeding the maximum, oxidation of ammonia to nitrogen oxides takes place increasingly, which is illustrated in FIG. 4 by a second curve 62. Particularly at temperatures of more than 300 degrees Celsius, conversion of ammonia to nitrogen oxides correspondingly takes place predominantly at the ammonia barrier catalyst 52.

By using the ammonia barrier catalyst 52 at a point close to the engine in the exhaust system 36, namely downstream of the particulate filter 48, the SCR system 50 close to the engine loses some of its conversion performance with regard to the conversion of nitrogen oxides with ammonia in the SCR reaction to nitrogen and water. This is because the ASC coating of the carrier material of the first SCR catalytic converter 46 counteracts the actual SCR reaction at higher temperatures of more than 300 degrees Celsius due to the oxidation of ammonia to nitrogen oxides. This is also age and technology dependent. However, the exhaust system 36 has the second SCR catalytic converter 54, which is arranged in the region of the underbody of the motor vehicle. This second SCR catalytic converter 54 is consequently at a temperature level that is 50 to 100 degrees Celsius lower than that of the SCR system 50 close to the engine. Due to the wide overlap region between the nitrogen oxide conversion of the SCR system 50 close to the engine and the underbody SCR catalytic converter 54, the slight loss in performance caused by the provision of the ammonia barrier catalyst 52 can therefore be easily compensated for.

Upstream of the second SCR catalyst 54, the exhaust system has a second metering device 64, by means of which the aqueous urea solution can also be introduced into the exhaust gas flowing through the exhaust pipe 38. In the present case, a branch 66 for a low-pressure exhaust gas recirculation is provided upstream of the second metering device 64 and downstream of the ammonia barrier catalyst 52.

Figure 5:
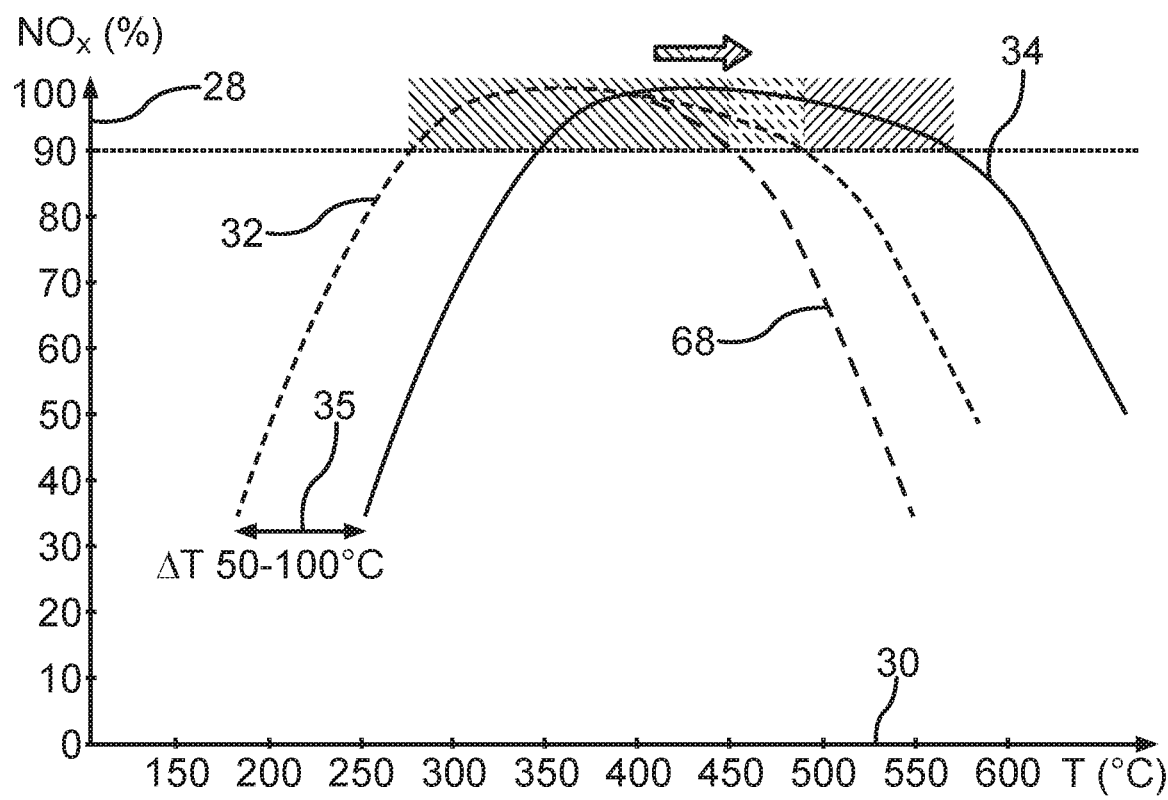
FIG. 5 shows curves, which illustrate the temperature-dependent nitrogen oxide conversion of the SCR system close to the engine according to FIG. 3 and of the second SCR catalytic converter according to FIG. 3.

By means of FIG. 5, it is to be illustrated at which temperatures downstream of the catalytic converter 40 the switchover between the metering of reducing agent via the first metering device 42 to metering by means of the second metering device 64 takes place. During this switchover, the centre of gravity of the nitrogen oxide conversion is shifted or transferred from a conversion by means of the SCR system 50 close to the engine to a conversion by means of the second SCR catalytic converter 54 remote from the engine and arranged on the underbody. Compared to the structure of the exhaust system 10 shown in FIG. 1, this switchover already takes place at somewhat lower temperatures.

Thus, FIG. 5 depicts the curve 32, which is already shown in FIG. 2, and also the curve 34, which shows the NOx conversion of the second SCR catalytic converter 54. A further curve 68 in FIG. 5 illustrates the nitrogen oxide conversion, which is dependent on the temperature present downstream of the catalytic converter 40, by means of the SCR system 50 of the exhaust system 36 close to the engine according to FIG. 3. In comparison to curve 32, the switchover points or switchover ranges between a metering by means of the front, first metering device 42 and the second, rear metering device 64 are shifted to lower temperatures by approximately 30 degrees Celsius to 60 degrees Celsius. Accordingly, at a temperature in a value range from about 420 degrees Celsius to about 450 degrees Celsius, the reducing agent is introduced into the exhaust gas, at least predominantly by means of the second metering device 64, for example in the form of the aqueous urea solution. This shift has no effect on the overall performance of the exhaust system 36 with regard to the reduction of the nitrogen oxide content in the exhaust gas. The temperature at which the switchover takes place also depends on the technology of the ammonia barrier catalyst 52 and on the ageing condition of the SCR system 50.

In the present case, only the quantity of reducing agent introduced into the exhaust gas by means of the second metering device 64 needs to be taken into account for the regulation of the ammonia level of the second SCR catalytic converter 54. Furthermore, if a threshold value of the temperature of the ammonia barrier catalyst 52 is exceeded, an active level reduction is enabled. This means that an over-metering of reducing agent, which is introduced into the exhaust gas by means of the first metering device 42, specifically oxidises ammonia to nitrogen oxides, namely by means of the ammonia barrier catalyst 52. This in turn leads to a reduction in the ammonia level of the second SCR catalytic converter 54.

The exact threshold temperature from which this active level reduction is enabled depends on the ageing state of the ammonia barrier catalyst 52 and can be between 250 degrees Celsius and 350 degrees Celsius, for example. The active level reduction is achieved by increasing the quantity of reducing agent which is introduced into the exhaust gas by means of the first metering device 42 and which leads to the formation of ammonia in the exhaust gas. This increase can be increased depending on the operating point up to the maximum permissible ammonia quantity depending on the temperature and the exhaust gas mass flow. Preferably, the active level reduction is enabled when the temperature of the SCR system 50 close to the engine or the ammonia barrier catalyst 52 exceeds a value of about 300 degrees Celsius. This temperature in a region of the exhaust system comprising the first SCR catalytic converter 46 and the ammonia barrier catalytic converter 52 can be recorded as an average value of a temperature model or via at least one (not shown) temperature sensor which is arranged at a corresponding position of the SCR system 50.

Figure 6:
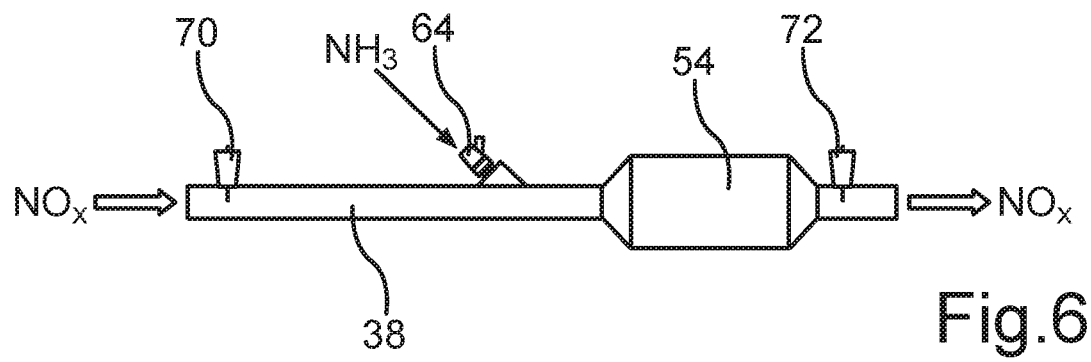
FIG. 6 illustrates the arrangement of nitrogen oxide sensors on an exhaust pipe of the exhaust system according to FIG. 3, wherein the nitrogen oxide sensors are arranged upstream of the second metering device upstream of the second SCR catalytic converter and downstream of the second SCR catalytic converter.

Preferably, only the quantity of reducing agent added to the exhaust gas at the second metering point, i.e., by means of the second metering device 64, is used as the input variable of a model which describes the filling level of the second SCR catalytic converter 54. This is because ammonia slip no longer occurs on the SCR system 50 close to the engine due to the provision of the ammonia barrier catalyst 52. This means that there is no falsification of a signal from a first sensor 70, which is arranged upstream of the second metering unit 64 in the exhaust system 36 (see FIG. 6). The first sensor 70, which is designed to detect the nitrogen oxide content in the exhaust gas, has a cross-sensitivity to ammonia. However, as no ammonia slip occurs any more on the SCR system 50 close to the engine, the signal supplied by the first sensor 70 is no longer falsified, which in principle can occur with such sensors due to the cross-sensitivity to ammonia of the first sensor 70. Rather, the nitrogen oxide conversion which is achieved by the second SCR catalytic converter 54 can be determined by means of the signals of the first sensor 70 and a further sensor 72 designed to detect the nitrogen oxide content in the exhaust gas, which is arranged downstream of the second SCR catalytic converter 54 in the exhaust system 36 (see FIG. 6).

The nitrogen oxide conversion can be determined from the signal of the first sensor 70 minus the signal supplied by the further sensor 72 in relation to the signal supplied by the first sensor 70. Furthermore, the ammonia level of the second SCR catalytic converter 54 can be determined by taking into account the quantity of ammonia introduced into the exhaust gas by means of the second metering device 64, from which the quantity of ammonia converted in the second SCR catalytic converter 54 is deducted. In addition, any ammonia slip occurring on the second SCR catalytic converter 54 is taken into account when determining the filling level of the second SCR catalytic converter 54.

However, both the nitrogen oxide content in the exhaust gas, which can be detected by the first sensor 70, and the quantity of reducing agent which can be introduced into the exhaust gas by the second metering device 64 are controllable variables, such that the ammonia loading of the second SCR catalytic converter 54 can be adjusted or regulated in an improved manner.

In order to carry out this adjustment or regulation, the exhaust system 36 comprises a control device 74, which is shown schematically in FIG. 3. The control device 74 controls the metering devices 42, 64 depending on the temperature and the exhaust gas mass flow. In particular, the control device 74 ensures that the quantity of reducing agent introduced into the exhaust gas by means of the first metering device 42 is increased when the temperature of a region of the exhaust system 36 comprising the first SCR catalytic converter 46 or the ammonia barrier catalytic converter 52 exceeds the predetermined threshold value.

LIST OF REFERENCE CHARACTERS 10 exhaust system
12 SCR system
14 metering device
16 diesel particulate filter
18 SCR catalytic converter
20 arrow
22 diesel oxidation catalytic converter
24 SCR catalytic converter
26 metering device
28 ordinate
30 abscissa 32 curve
34 curve
36 exhaust system
38 exhaust pipe
40 catalytic converter
42 metering device
44 arrow
46 SCR catalytic converter
48 particulate filter
50 SCR system
52 ammonia barrier catalyst
54 SCR catalytic converter
56 ordinate
58 abscissa
60 curve
62 curve
64 metering device
66 branch
68 curve
70 sensor
72 sensor
74 control device

The invention claimed is:

1. A method for operating an exhaust system of an internal combustion engine of a motor vehicle in which an exhaust gas from the internal combustion engine flows through a first selective catalytic reduction (SCR) catalytic converter, wherein the first SCR catalytic converter is followed by an ammonia barrier catalyst, and flows through a second SCR catalytic converter which is disposed downstream of the ammonia barrier catalyst, comprising the steps of:
    introducing a reducing agent into the exhaust gas by a first metering device upstream of the first SCR catalytic converter and by a second metering device upstream of the second SCR catalytic converter;
    increasing a quantity of the reducing agent introduced into the exhaust gas by the first metering device when a predetermined threshold value of a temperature of a region of the exhaust system comprising the first SCR catalytic converter and/or the ammonia barrier catalyst is exceeded; and
    increasing the quantity of reducing agent introduced into the exhaust gas by the first metering device when, in addition to when the predetermined threshold value is exceeded, ammonia stored in the second SCR catalytic convener is leaking from the second SCR catalytic converter.

2. The method according to claim 1, wherein the predetermined threshold value is selected from a range of temperature values from 250 degrees Celsius to 350 degrees Celsius.

3. The method according to claim 1 further comprising the step of taking into account an ageing state of the ammonia barrier catalyst and/or a technology of the ammonia barrier catalyst when selecting the predetermined threshold value.

4. The method according to claim 1, wherein the quantity of the reducing agent is increased to at least one and a half times a quantity which was introduced into the exhaust gas by the first metering device before the predetermined threshold value was exceeded.

5. The method according to claim 1, wherein, depending on a temperature of the exhaust gas in the exhaust system upstream of the first metering device, the reducing agent is introduced into the exhaust gas at least predominantly by the second metering device.

6. The method according to claim 5, wherein the temperature is 420 degrees Celsius to 4.50 degrees Celsius.

7. The method according to claim 1 further comprising the step of determining a quantity of reducing agent present in the second SCR catalytic converter by taking into account only a quantity of reducing agent introduced into the exhaust gas by the second metering device.

8. The method according to claim 1, wherein the ammonia barrier catalyst is provided as an oxidizing coating applied to a support material of the first SCR catalytic converter in an outlet-side end region of the first SCR catalytic converter.

9. An exhaust system of an internal combustion engine of a motor vehicle, comprising:
    a first SCR catalytic converter through which an exhaust gas from the internal combustion engine is flowable;
    an ammonia barrier catalyst disposed downstream of the first SCR catalytic converter; and
    a second SCR catalytic converter disposed downstream of the ammonia barrier catalyst;
    wherein a reducing agent is introducible into the exhaust gas by a first metering device upstream of the first SCR catalytic converter and by a second metering device upstream of the second SCR catalytic converter; and
    a control device which is configured to increase a quantity of reducing agent introduced into the exhaust gas by the first metering device when a predetermined threshold value of a temperature of a region of the exhaust system comprising the first SCR catalytic converter and/or the ammonia barrier catalytic converter is exceeded;
    wherein the control device is configured to increase the quantity of reducing agent introduced into the exhaust gas by the first metering device when, in addition to when the predetermined threshold value is exceeded, ammonia stored in the second SCR catalytic converter is leaking from the second SCR catalytic converter.

* * * * *